Nov. 5, 1963 E. T. HUMBY 3,109,656

AUTOMATIC RECORD CHANGERS

Filed April 4, 1960 3 Sheets-Sheet 1

Inventor
E. T. Humby
By Holcombe, Wetherill & Brisebois
Attorneys

Nov. 5, 1963 E. T. HUMBY 3,109,656

AUTOMATIC RECORD CHANGERS

Filed April 4, 1960 3 Sheets-Sheet 2

Inventor
E. T. Humby
By Holcombe Wetherill & Brisebois
Attorneys

Nov. 5, 1963 E. T. HUMBY 3,109,656

AUTOMATIC RECORD CHANGERS

Filed April 4, 1960 3 Sheets-Sheet 3

Inventor
E. T. Humby
By Holcombe, Wetherill & Brisebois
Attorneys

United States Patent Office 3,109,656
Patented Nov. 5, 1963

3,109,656
AUTOMATIC RECORD CHANGERS

Edward Thomas Humby, Emerson Park, Hornchurch, England, assignor to The Magnavox Electronics Company Limited Filed Apr. 4, 1960, Ser. No. 19,701
Claims priority, application Great Britain Apr. 27, 1959
2 Claims. (Cl. 274—10)

In automatic record-changers, after one record has been played, the pick-up arm is raised and swung outwards, the next record is placed on the turntable and the pick-up arm is swung inwards again into a position immediately above the edge of the record which has just been placed on the turntable. All these operations are effected automatically by what is commonly known as a change-cycle mechanism.

One particular record changer which is described in application No. 688,950 in the United States now Patent No. 3,017,188 has a change-cycle mechanism which includes a rotary disc which makes one complete revolution in each change cycle, and a pivoted pick-up arm which is moved about its pivot by a cam follower arm which is connected to the pick-up arm through a clutch and which is actuated by cam surfaces on the disc. One of these cam surfaces controls the position into which the pick-up arm is moved inwards and from which the pick-up arm is lowered to place the stylus on the edge of a record on the turntable.

It is important that the position into which the pick-up arm is swung inwards should be accurately located so that the stylus is lowered on to the edge of the record in a position where the stylus is picked up by the run-in groove. If the pick-up cartridge in the pick-up arm is changed so that the position of the stylus on the arm is altered, it is necessary to adjust the position into which the pick-up arm is swung inwards. A similar adjustment may become necessary due to wear of the change-cycle mechanism.

The usual way of adjusting the position into which the pick-up is moved inwards has been by adjusting the position of the cam plate, which carries the relevant cam surface, on the disc.

It has always been necessary, however, in order to effect this adjustment, partially to dismantle the gramophone so that access to the cam member can be obtained.

This dismantling is rather undesirable and expensive and, so that it can be avoided, according to the present invention, the cam surface which controls the position into which the pick-up arm is moved inwards and from which the pick-up arm is lowered to place the stylus on the edge of a record on the turntable, is on a cam which is pivotally mounted on the rotary disc and an adjustable stop is provided with which the cam comes into engagement whilst it is also in engagement with the cam follower arm, adjustment of the position of the stop altering the angular position of the cam relatively to the rotary disc as the cam comes to the end of its engagement with the cam follower arm and so adjusting the position of the cam follower arm relative to the pick-up arm and thus also the position into which the pick-up arm is swung inwards.

With this arrangement, the adjustable stop can be attached to the base board of the record changer or to some other fixed part in such a position that it can easily be adjusted without dismantling the record changer.

Preferably, the adjustable stop is a disc attached eccentrically to a spindle, rotation of the spindle then altering the position of the part of the periphery of the disc with which the cam member comes into contact.

An example of a record changer constructed in accordance with the invention is illustrated in the accompanying drawings, in which.

Figures 1, 2:
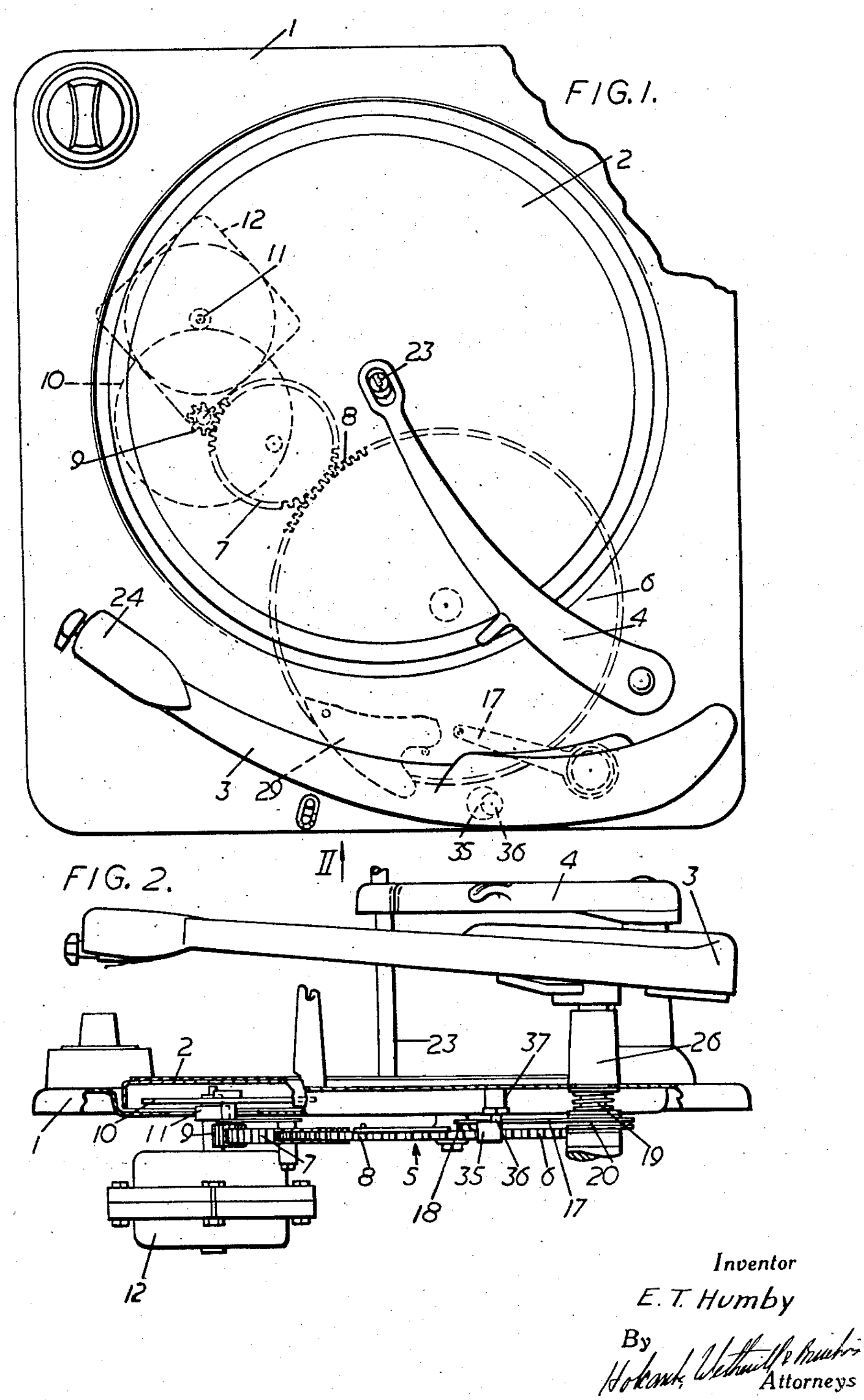
FIGURE 1 is a plan view of the record changer showing part of the base board cut away.
FIGURE 2 is a side elevation of the record changer as seen in the direction of the arrow II in FIGURE 1.

The record changer has base board 1 on which a turntable 2, a pick-up arm 3 and a balance arm 4 are mounted. Below the base board 1 is a change-cycle mechanism 5, the most important part of which is a rotary disc 6. The rotary disc 6 is rotated once in each complete record change cycle by a pinion 7 which meshes with gear teeth 8 formed around the edge of the disc 6 and which is itself rotated by a pinion 9 which is fixed to a rubber idler wheel 10. The rubber idler wheel is driven by a spindle 11 of an electric motor 12.

All these parts of the change-cycle mechanism are conventionally arranged and since they form no part of the present invention they are not described in detail. A similar change-cycle mechanism is described in U.S. application No. 688,950, now U.S. Patent No. 3,017,188.

Figure 3:
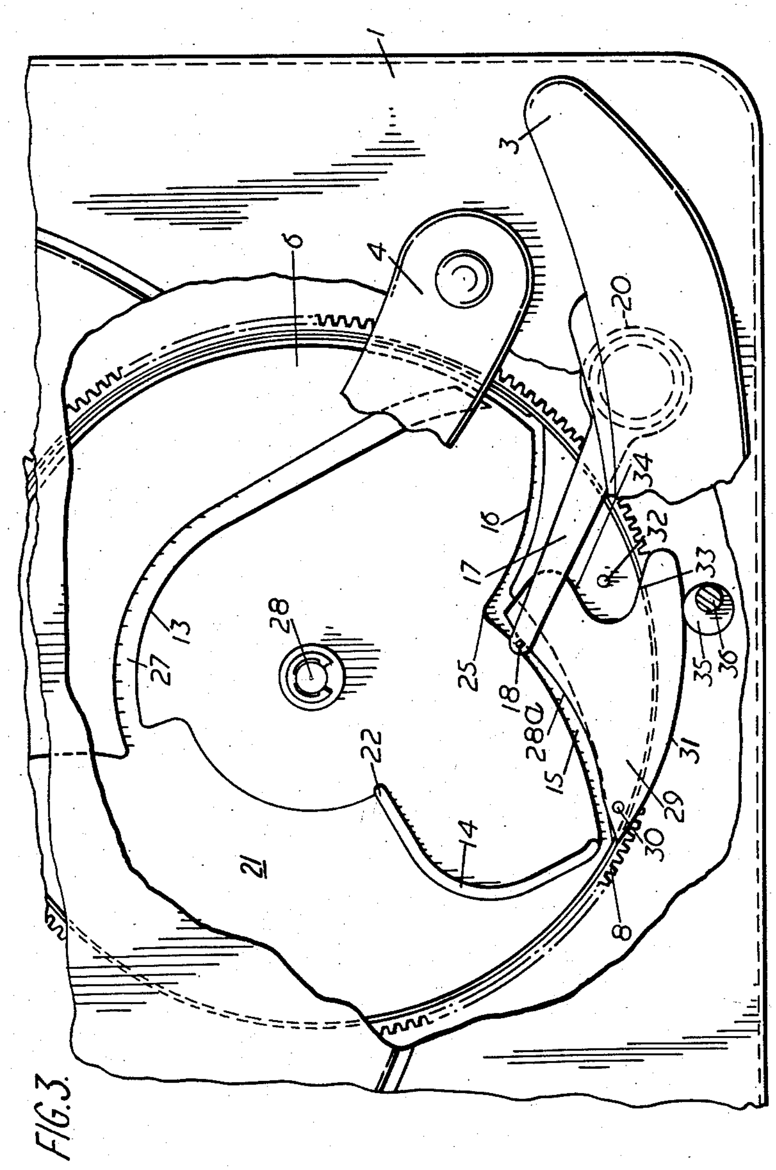
FIGURE 3 is a plan view to a larger scale of part of the record changer shown in FIGURE 1, showing a part of the base board cut away to illustrate the rotary disc forming a part of the change-cycle mechanism.
Figure 4:
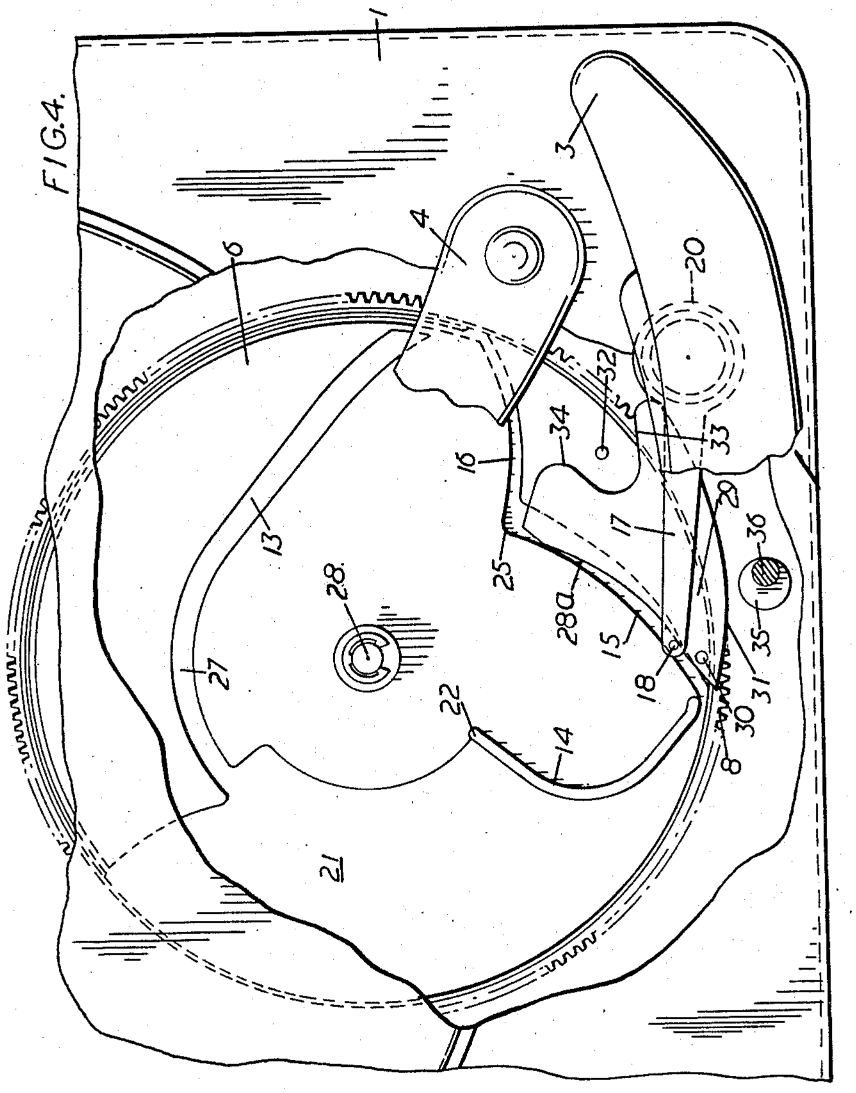
FIGURE 4 is a plan similar to FIGURE 3, but showing the rotary disc at a earlier stage during its cycle of operation.

As shown most clearly in FIGURES 3 and 4 of the drawings, the disc 6 is formed with a number of cam grooves 13, 14, 15 and 16. An arm 17 having a downwardly projecting pin 18, which forms a cam follower at its outer end, is mounted on a spindle 19 projecting downwardly from the pick-up arm 3. The arm 17 is connected to the spindle 19 so that rotation of the arm 17 causes a corresponding rotation of the pick-up arm 3 by means of a friction clutch 20. During the course of a record change-cycle the disc 6 is rotated by the mechanism already described through one complete revolution in a clockwise direction as seen from above.

The mechanism in general operates in the manner described in detail in U.S. application No. 688,950, now U.S. Patent No. 3,017,188. Briefly this is as follows:

Whilst the record is actually being played the pin 18 lies in an open depression 21 in the disc 6. Because of this the movement of the pin 18 is not restricted, and the pick-up arm and with it the arm 17, are free to move inwards towards the centre of the turntable 2. When the playing of the record is complete, the change-cycle mechanism is set in operation and the disc 6 starts to rotate. First of all this causes the pick-up arm to be lifted so that the stylus is moved out of contact with the record. This is brought about by a mechanism which forms no part of the present invention and it is not therefore illustrated. Also as the disc 6 rotates the pin 18 moves into the inner end 22 of the groove 14. Continued rotation of the disc 6 causes the pin 18 to move outwards along the groove 14 and this swings the arm 17 and with it the pick-up arm 3 outwards beyond the edge of the record on the turntable and also beyond the edge of the lowermost record in the stack on a magazine spindle 23 projecting upwards from the centre of the turntable.

At this stage of the record change-cycle the pickup arm is lifted still further so that the pick-up 24 itself lies above the level of the lowermost record in the stack.

The pin 18 then starts to move inwards along the groove 15 and the pick-up arm 3 is therefore swung inwards.

As described in U.S. application No. 688,950, now U.S. Patent No. 3,017,188, in the course of this inward movement the inside face of the pick-up 24 comes into contact with the edge of the lowermost record in the stack on the spindle 23. This happens before the pin 18 reaches the innermost end 25 of the groove 15 and when it happens the pick-up arm 3 can no longer move inwards. The arm 17 does, however, continue to be moved inwards by the pin 18 in the groove 15 and therefore the clutch 20 slips. This alters the angular position of the arm 17 relatively to the pick-up arm 3.

Next the pin 18 starts to move outwards along the groove 16. This moves the pick-up 24 away from the edge of the lowermost record in the stack on the spindle 23 and as this happens a release lever in the spindle 23 is operated, by a mechanism not shown, and the lowermost record in the stack is dropped on to the turntable. Outward movement of the pick-up arm 3 continues until it comes up against a stop built into a pedestal 26 through which the spindle 19 passes. When this happens the outward movement of the pin 18 along the groove 16 is also restrained because of the frictional drag of the clutch 20 and because the left-hand edge, as seen in FIGURES 3 and 4, of the groove 16 is bevelled, the pin 18 climbs out of the groove 16 and moves across the surface of the disc into the groove 13. The pin 18 then moves inwards along the groove 13 until it reaches a circular portion 27 of the groove 13. The circular portion 27 has the same centre of curvature 28 as the disc 6 and therefore whilst the pin 18 moves around the portion 27 the pick-up arm remains stationary as far as its lateral movement is concerned. At this stage the pick-up arm is lowered so that the stylus is placed on the edge of the record which has just been dropped on to the turntable. Rotation of the disc 6 finishes when the pin re-enters the open depression 21.

It will be seen that the position into which the pick-up arm is moved inwards before it is finally lowered depends on the position of the outer edge of the circular portion 27 of the groove 13 and also upon the setting of the angular position of the arm 17 relatively to the pick-up arm 3. This setting is dependent upon the position of the outer edge of the groove 15. The position of the outer edge of the portion 27 of the groove 13 cannot be adjusted. Therefore, to enable the set-down position of the pick-up to be adjusted the position of the effective outside edge of the groove 15 is adjusted. It is with this adjustment that the present invention is concerned.

As shown most clearly in FIGURES 3 and 4 of the drawings, the effective outside edge of the groove 15 is formed by an edge **28*a* of a plate 29 which is pivotally attached to the disc 6 by a pin 30**.

The outside edge 31 of the plate 29 is circular and has the same radius as the outside edge of the disc 6. The movement of the plate 29 about its pivot pin 30 is restricted by a further pin 32 which projects upwards from the disc 6 and limits the inward movement of the plate 29 by coming into contact with a surface 33 and also limits the outward movement of the plate 29 by coming into contact with a surface 34.

As the disc 6 rotates and the pin 18 starts to move inwards along the groove 15 the edge 31 of the plate 29 comes into contact with an eccentric disc 35 fixed on a spindle 36 which is rotatably mounted in a tapped bush 37 fixed to the underside of the base plate 1. This contact pushes the plate 29 inwards and so locates the inside edge **28*a* of the plate 29 which in turn locates the pin 18. The spindle 36 is threaded and is screwed into the tapped bush 37. The spindle is held in the bush by a device known as a dot nut which is set to provide a predetermined locking torque. The upper end of the spindle 36 is accessible through a hole in the base plate 1 and has a screwdriver slot in it. By means of this slot the spindle 36 can be rotated and with it the eccentric disc 35** is rotated.

Clockwise rotation of the disc 35 from its position shown in FIGURES 3 and 4 of the drawings, causes the disc to move inwards towards the edge of the disc 6. This brings about a corresponding inward movement of the edge **28*a* which in turn causes the pin 18 to be moved further inwards as it moves down the groove 15. Counterclockwise movement of the disc 35 from its position shown in FIGURES 3 and 4 allows the plate 29 to move outwards further as it moves past the disc 35 and this in turn causes the pin 18 to be moved not quite so far inwards as it moves along the groove 15**.

As already explained the pick-up arm 3 is checked in its inward movement by engagement of the pick-up 24 with the lowermost record in the stack on the spindle 23 and in consequence movement of the edge **28*a* of the plate 29 inwards or outwards alters the angular position in which the arm 17 is set relative to the pick-up arm 3. It will readily be seen that this in turn alters the position into which the pick-up arm 3 is swung inwards as the pin 18 moves along the portion 27 of the groove 13 and thus the position in which the pick-up 24 is set down on the edge of the record. The adjustment of the position of the disc 35** and thus of the set-down position of the pick-up can be carried out without any dismantling whatsoever of the record changer mechanism.

FIGURE 4 of the drawings shows the mechanism at a slightly earlier stage of the cycle than is shown in FIGURE 3. At this earlier stage the pin 18 engages the edge 28 of the plate 29 and swings the plate 29 outwards until its surface 34 comes into contact with the pin 32.

In the next cycle of operations the disc 35 again runs along the edge 31 and moves the plate 29 inwards into its operative position.

I claim:

1. In an automatic record changing phonograph of the type having turntable, a main driving motor, means for operatively connecting said motor to said turntable, a pivoted pick-up arm mounted to swing over said turntable, a stylus on said pick-up arm, a change-cycle mechanism including a rotary disc, means for operatively connecting said disc to said motor to cause said disc to perform one complete revolution during each change-cycle and cam means on said disc, a pivotally mounted follower arm operatively associated with said cam means, and friction clutch means connecting said pick-up arm to said pick-up arm for pivotal movement therewith to swing said follower arm outwards after a record on said turntable has been played and subsequently inwards again into a position from which said pick-up arm is lowered to place said stylus on the edge of the next record to be played at a radial position determined by the relative positions of said follower arm and pick-up arm, said pick-up arm being blocked against radially inward movement at one stage of each change-cycle, a cam plate adjustably mounted on said disk, said cam plate having a cam surface positioned to guide said follower arm at said one stage of said change-cycle, and a baseboard between said disk and turntable, the improvement which comprises stop means adjustably carried beneath said baseboard on a stationary portion of the phonograph and means extending above said baseboard for adjusting the position of said stop means radially of said disk, said cam plate being pivotally mounted on said disk to swing during rotation of said disk in a plane parallel thereto and said stop means being positioned to engage an edge of said cam plate and, when inwardly adjusted, shift said cam plate radially inward, so that it guides said follower arm radially inward during said one stage of said change-cycle, despite the fact that said pick-up arm it then prevented from moving inward with it, thus casing said clutch to slip and said follower arm to assume a new position relative to said pick-up arm and altering the radial position of said pickup arm when it is lowered to place said stylus on said record.

2. An automatic record changer according to claim 1 in which said stop adjusting means is a vertical spindle accessible above said base board, and said stop is a circular member attached eccentrically to said spindle below said base board, so that rotation of said spindle alters the position of the part of said circular member engaging said cam.

References Cited in the file of this patent

UNITED STATES PATENTS

| | | |
|---|---|---|
| 3,038,727 | Hansen | June 12, 1962 |
| 3,044,782 | Hansen | July 17, 1962 |

FOREIGN PATENTS

| | | |
|---|---|---|
| 805,964 | Great Britain | Dec. 17, 1958 |